(12) United States Patent
Tiew et al.

(10) Patent No.: US 7,855,535 B2
(45) Date of Patent: Dec. 21, 2010

(54) INRUSH CURRENT CONTROL

(75) Inventors: Kee-Chee Tiew, Richardson, TX (US);
H. Pooya Forghani-zadeh, Dallas, TX (US); William Aubrey Mayfield, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 243 days.

(21) Appl. No.: 11/857,571

(22) Filed: Sep. 19, 2007

(65) Prior Publication Data

US 2009/0072803 A1 Mar. 19, 2009

(51) Int. Cl.
*G05F 1/00* (2006.01)
(52) U.S. Cl. ........................ 323/274; 323/908
(58) Field of Classification Search .................. 323/235, 323/274, 277, 282, 284, 303, 315, 908; 363/50, 363/60; 327/148, 157, 166, 176, 178, 180, 327/182, 536
See application file for complete search history.

(56) References Cited

U.S. PATENT DOCUMENTS

| | | | |
|---|---|---|---|
| 4,866,585 A | 9/1989 | Das | |
| 5,502,610 A | 3/1996 | Chaney | |
| 5,610,502 A * | 3/1997 | Tallant et al. | 323/222 |
| 5,625,580 A | 4/1997 | Read et al. | |
| 6,185,082 B1 | 2/2001 | Yang | |
| 6,188,210 B1 * | 2/2001 | Tichauer et al. | 323/273 |
| 6,275,395 B1 | 8/2001 | Inn et al. | |
| 6,624,994 B1 * | 9/2003 | Schmoock et al. | 361/93.1 |
| 7,009,857 B2 | 3/2006 | Chen et al. | |
| 7,095,217 B1 * | 8/2006 | Niculae et al. | 323/274 |
| 7,245,116 B2 * | 7/2007 | Tateno et al. | 323/316 |
| 2007/0195476 A1 * | 8/2007 | Sander | 361/93.1 |

* cited by examiner

*Primary Examiner*—Adolf Berhane
*Assistant Examiner*—Emily Pham
(74) *Attorney, Agent, or Firm*—William B. Kempler; Wade J. Brady, III; Frederick J. Telecky, Jr.

(57) ABSTRACT

One embodiment of the present invention includes a power supply system. The power supply system comprises a variable voltage source configured to provide and incrementally increase a control voltage associated with a pass-transistor. The power supply system also comprises an inrush current monitor configured to monitor a current-flow through the pass-transistor. The power supply system further comprises a voltage control circuit configured to halt the incremental increase of the control voltage in response to the current-flow exceeding a predetermined current limit.

20 Claims, 4 Drawing Sheets

INRUSH CURRENT CONTROL

TECHNICAL FIELD

This invention relates to electronic circuits, and more specifically to inrush current control.

BACKGROUND

In a variety of different power supply circuits, such as linear and switching power regulators, a pass-transistor, such as a pass-field-effect transistor (pass-FET), can be implemented to drive a capacitive load, such as a capacitor. In low voltage applications, such as to achieve low switch resistance and to avoid occupying a large amount of space in an integrated circuit (IC), the control voltage (e.g., gate voltage) of the pass-transistor can be incrementally increased, such as via a charge pump. The control voltage can be incrementally increased very quickly to increase an activation time of the switch and thus to increase a charging time of the capacitive load. However, such a rapid incremental increase in the control voltage can result in a large inrush current that can be harmful to both the pass-transistor and an associated voltage supply (e.g., battery).

One typical solution to limiting inrush current is to decrease the rate of incremental increase of the control voltage of the pass-transistor. However, by decreasing the rate of the incremental increase of the control voltage, an amount of time to charge a capacitive load is increased. Another typical solution to limiting inrush current is to switch to a different pass-transistor to reduce current-flow as the capacitive load is charged. However, to reduce the current-flow to limit inrush current, the current-flow to the capacitive load is decreased to such a degree as to also increase the charging time of the capacitor. Yet another typical solution to limiting inrush current is to pull-down on the control voltage upon detecting a large amount of inrush current. However, pulling-down on the control voltage depletes both the current-flow through the pass-transistor and the stored charge in the capacitive load. As a result, performance of a power supply circuit can be detrimentally affected by any of these typical solutions.

SUMMARY

One embodiment of the present invention includes a power supply system. The power supply system comprises a variable voltage source configured to provide and incrementally increase a control voltage associated with a pass-transistor. The power supply system also comprises an inrush current monitor configured to monitor a current-flow associated with the pass-transistor. The power supply system further comprises a voltage control circuit configured to halt the incremental increase of the control voltage in response to the current-flow exceeding a predetermined current limit.

Another embodiment of the present invention includes a method for limiting inrush current associated with a pass-transistor. The method comprises setting a predetermined limit voltage that is associated with a desired current limit through the pass-transistor. The method also comprises incrementally increasing a control voltage that is associated with the pass-transistor based on a clock signal to provide a current-flow through the pass-transistor. The method further comprises masking the clock signal in response to a sense-voltage that is associated with the current-flow being greater than the predetermined limit voltage.

Another embodiment of the present invention includes a power supply system. The power supply system comprises means for charging a capacitive load upon incrementing an enable signal. The power supply system also comprises means for incrementally increasing a control voltage associated with the means for charging to provide a current-flow through the capacitive load based on a clock signal. The power supply system further comprises means for monitoring a magnitude of the current-flow through the capacitive load, and means for masking the clock signal in response to the magnitude of the current-flow being greater than a predetermined current limit.

DETAILED DESCRIPTION

The present invention relates to electronic circuits, and more specifically to inrush current control. A variable voltage source, such as a charge pump, can be enabled to incrementally increase a control voltage to activate a pass-transistor in a linear mode, such as by increasing a gate voltage to a pass-field effect transistor (pass-FET). The control voltage can also be provided to activate a second transistor that is configured in series with a sense-resistor, with the second transistor and the sense-resistor being arranged in a parallel current path with the pass-transistor. As a result, a portion of the charging current of a capacitive load that is proportional to the current-flow through the pass-transistor flows through the sense-resistor. A differential amplifier can generate a sense-voltage that is associated with the current-flow through the pass-transistor, and thus the charging current.

The sense-voltage can be compared with a predetermined limit voltage that is set to a limit that is associated with a maximum desired inrush current. Upon the sense-voltage being greater than the predetermined limit voltage, a clock signal that controls the rate at which the control voltage incrementally increases can be masked. As an example, the clock signal can be set to have a frequency that is substantially equal to zero, such as via a logical-AND operation with a logic-low signal. As a result, the incremental increase of the control voltage is halted. Therefore, the inrush current is limited while the capacitive load continues to charge. As the current-flow through the pass-transistor decreases, the clock signal can become unmasked, allowing the control voltage to continue to increase. As a result, the pass-transistor can continue to become activated, and the capacitive load can continue to be charged, while the current-flow remains approximately less than or equal to the maximum desired inrush current.

Figure 1:
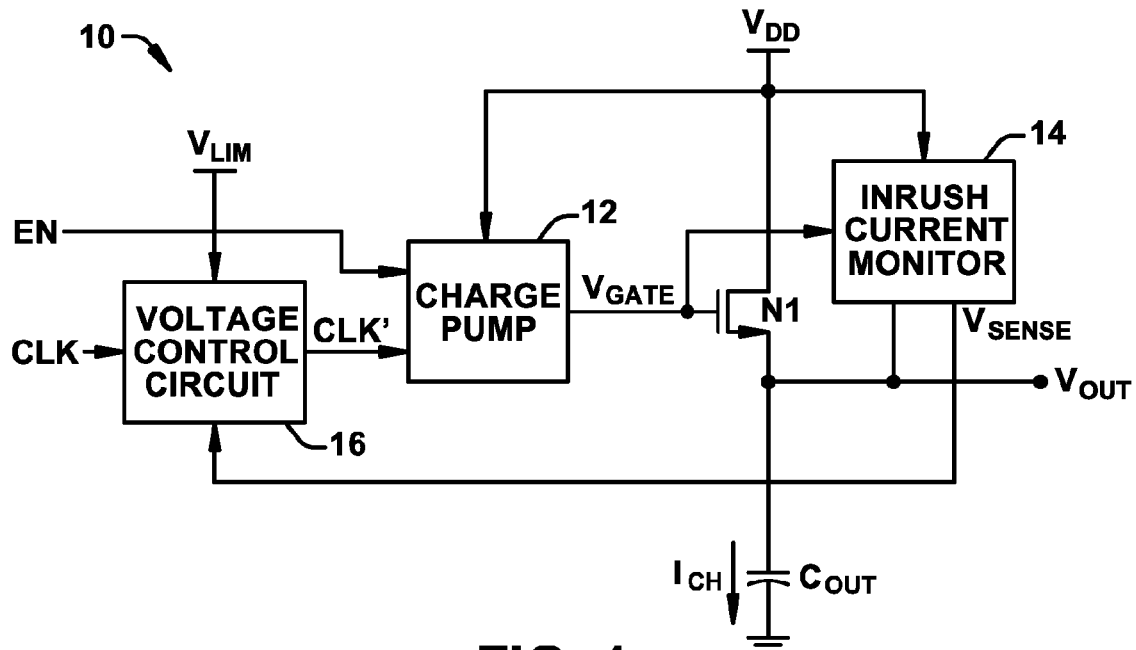
FIG. 1 illustrates an example of a power supply system in accordance with an aspect of the invention.

FIG. 1 illustrates an example of a power supply system 10 in accordance with an aspect of the invention. The power supply system 10 can be implemented as part of a switching power converter, buck and/or boost converter, linear power regulator, or any of a variety of other power providing applications. The power supply system 10 includes a pass-transistor, demonstrated in the example of FIG. 1 as a pass-FET N1. In the example of FIG. 1, the pass-FET N1 is configured as an N-type FET, but it is to be understood that the pass-FET N1 could be implemented instead as a P-type FET, or as a different type of transistor, such as a bipolar junction transistor (BJT). The pass-FET N1 is activated to couple a load capacitor $C_{OUT}$ to a positive supply voltage $V_{DD}$, such that the load capacitor $C_{OUT}$ is charged based on a current $I_{CH}$.

The power supply system 10 includes a charge pump 12 that is configured to activate the pass-FET N1. Specifically, upon receiving an enable signal EN, the charge pump 12 begins to incrementally increase a control voltage for the pass-FET N1, demonstrated in the example of FIG. 1 as a gate voltage $V_{GATE}$. The rate of incrementation of the gate voltage $V_{GATE}$ is controlled by a frequency of a clock signal CLK, such that the gate voltage $V_{GATE}$ increases at a higher rate based on a relatively higher frequency of the clock signal CLK. Therefore, the charging time of the load capacitor $C_{OUT}$ can be controlled by varying the frequency of the clock signal CLK. In the example of FIG. 1, the charge pump 12 receives a modified clock signal CLK' as an input, as is described in greater detail below.

As the gate voltage $V_{GATE}$ incrementally increases, the pass-FET N1 switches from a cutoff region of operation and becomes activated in a linear (i.e., triode) region of operation. As a result, a resistance associated with the pass-FET N1 decreases at each increment that the gate voltage $V_{GATE}$ increases. Therefore, the current $I_{CH}$ that flows through the load capacitor $C_{OUT}$ increases at each increment that the gate voltage $V_{GATE}$ increases. Accordingly, the load capacitor $C_{OUT}$ begins to collect charge, which results in an increase of an output voltage $V_{OUT}$ between the source of the pass-FET N1 and the load capacitor $C_{OUT}$. The rate at which the current $I_{CH}$ increases can depend on a number of factors, such as the capacitance value of the load capacitor $C_{OUT}$, the frequency of the clock signal CLK, and the magnitude of the increments of the pass-FET N1. Higher levels of the current $I_{CH}$ can result in damage to the pass-FET N1, and/or a power source that provides the positive supply voltage $V_{DD}$, such as a battery. However, it is desirable to maintain a fast charging time of the load capacitor $C_{OUT}$.

The power supply system 10 includes an inrush current monitor 14 that is configured to monitor a current-flow associated with the current $I_{CH}$. Specifically, the inrush current monitor 14 occupies a current path that is arranged in parallel with the pass-FET N1, such that it interconnects the positive supply voltage $V_{DD}$ and the output voltage $V_{OUT}$. In addition, the inrush current monitor 14 is controlled by the gate voltage $V_{GATE}$, similar to the pass-FET N1. Therefore, the inrush current monitor 14 is configured to monitor a current-flow through the parallel current path, which is proportional to the current-flow through the pass-FET N1 and is a portion of the current $I_{CH}$ through the load capacitor $C_{OUT}$. As a result, the magnitude of the current-flow that is monitored by the inrush current monitor 14 can be implemented to ascertain the magnitude of the current $I_{CH}$ and/or the current-flow through the pass-FET N1.

The inrush current monitor 14 generates a voltage $V_{SENSE}$ in response to the monitored current-flow. The voltage $V_{SENSE}$ can thus have a value that is associated with the magnitude of the current $I_{CH}$ and/or the current-flow through the pass-FET N1. The voltage $V_{SENSE}$ is provided to a voltage control circuit 16. The voltage control circuit 16 also receives both the clock signal CLK and a predetermined limit voltage $V_{LIM}$ as inputs, and provides the modified clock signal CLK' to the charge pump 12. The voltage $V_{LIM}$ can be a voltage that is set to define a predetermined current limit for the current $I_{CH}$ and/or the current-flow through the pass-FET N1. The voltage $V_{LIM}$ can be programmable, or can be set at a fixed potential.

The voltage control circuit 16 is configured to compare the magnitude of the voltage $V_{SENSE}$ with the voltage $V_{LIM}$. As an example, when the voltage $V_{SENSE}$ is less than the limit voltage $V_{LIM}$, the voltage control circuit 16 provides the modified clock signal CLK' as the clock signal CLK, such that the clock signal CLK is provided substantially unchanged directly to the charge pump 12. When the magnitude of the voltage $V_{SENSE}$ is greater than the voltage $V_{LIM}$, the voltage control circuit 16 identifies that the magnitude of the current $I_{CH}$ and/or the current-flow through the pass-FET N1 is too large. In response, the voltage control circuit 16 is configured to mask the clock signal CLK to the charge pump 12, such that the voltage control circuit 16 sets the frequency of the modified clock signal CLK' at approximately zero (i.e., a logic-low DC signal). The masking of the clock signal CLK can occur through a logic operation, such as a logic-AND operation of the clock signal CLK with a logic-low signal.

As a result of the masking of the clock signal CLK to the charge pump 12, the charge pump 12 halts the incremental increase of the gate voltage $V_{GATE}$, thus freezing the gate voltage $V_{GATE}$ to a substantially constant magnitude. Therefore, the resistance of the pass-FET N1 also remains constant. In response, the current $I_{CH}$ does not increase, and thus temporarily remains substantially equal to the predetermined current limit defined by the limit voltage $V_{LIM}$.

Because the gate voltage $V_{GATE}$ remains constant, the current $I_{CH}$ continues to flow to the load capacitor $C_{OUT}$ upon the current $I_{CH}$ achieving the predetermined current limit. Therefore, the output voltage $V_{OUT}$ continues to increase, causing the current $I_{CH}$ to be reduced in magnitude. Therefore, the voltage $V_{SENSE}$ likewise begins to decrease. Upon the voltage $V_{SENSE}$ becoming less than the limit voltage $V_{LIM}$, the voltage control circuit 16 unmasks the clock signal CLK. Accordingly, the charge pump 12 is once again provided with the clock signal CLK, such that the gate voltage $V_{GATE}$ can continue to incrementally increase, resulting in more of the current $I_{CH}$ being provided to the load capacitor $C_{OUT}$. The current $I_{CH}$ can thus substantially waver above and below the predetermined current limit as the cycle of masking and unmasking of the clock signal CLK is repeated based on the current monitoring of the inrush current monitor 14 and the comparison of the voltage $V_{SENSE}$ with the limit voltage $V_{LIM}$ by the voltage control circuit 16.

As a result of the continued masking and unmasking of the clock signal CLK, the gate voltage $V_{GATE}$ can be controlled to provide a substantially steady amount of the current $I_{CH}$, such as defined by the predetermined current limit. Therefore, the load capacitor $C_{OUT}$ can be rapidly charged despite limiting the magnitude of the current $I_{CH}$. Accordingly, the inrush current through the pass-FET N1 can be limited while maintaining a rapid charging time of the load capacitor $C_{OUT}$.

It is to be understood that the power supply system 10 is not intended to be limited to the example of FIG. 1. As described above, the power supply system 10 is not limited to the use of an N-type FET as the pass-transistor, but that any of a variety of different types of transistors can be implemented. As another example, the load is not limited to the use of the load capacitor $C_{OUT}$, but could be any of a variety of capacitive, inductive, and/or resistive loads. Therefore, the power supply system 10 can be configured in any of a variety of ways.

Figure 2:
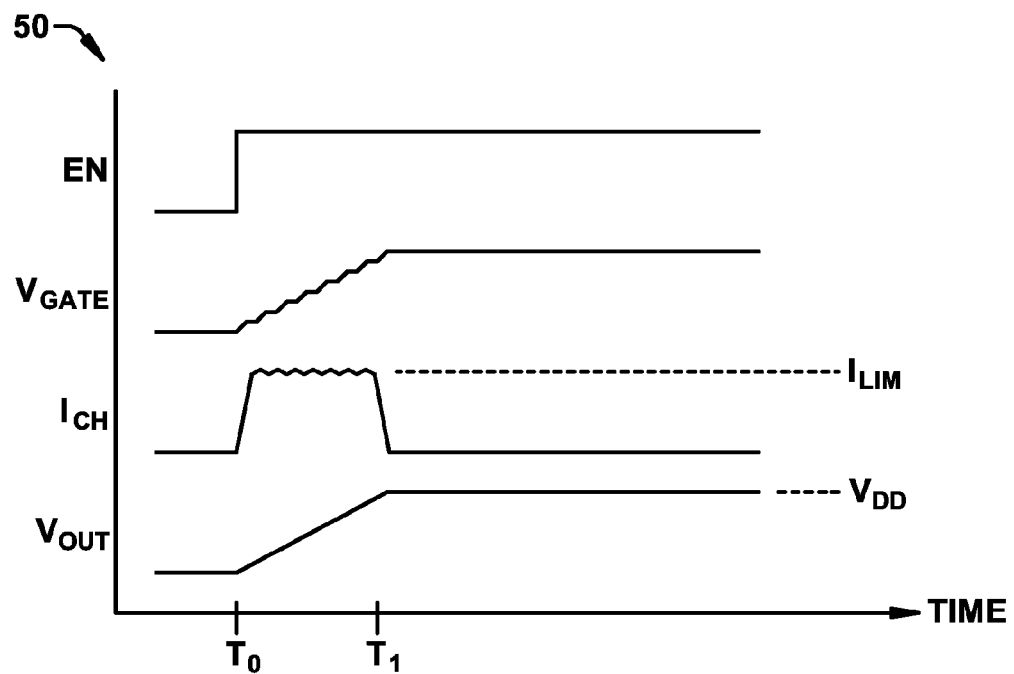
FIG. 2 illustrates an example of a timing diagram in accordance with an aspect of the invention.

FIG. 2 illustrates an example of a timing diagram 50 in accordance with an aspect of the invention. The timing diagram 50 can correspond to the power supply system 10 in the example of FIG. 1. Therefore, reference is to be made to the example of FIG. 1 in the discussion of FIG. 2. In addition, it is to be understood that the timing diagram 50 is demonstrated as an ideal timing diagram in the example of FIG. 2. As such, inherent delays and magnitude variations that may be present in the power supply system 10 in the example of FIG. 1 are not demonstrated in the timing diagram 50 in the example of FIG. 2.

At a time $T_0$, the enable signal EN is asserted (i.e., logic-high). Therefore, the charge pump 12 begins to incrementally increase the gate voltage $V_{GATE}$ to activate the pass-FET N1, thus decreasing the resistance of the pass-FET N1. In response, the current $I_{CH}$ begins to flow at a substantially high magnitude, thus demonstrating the inrush of the current $I_{CH}$. Because the current $I_{CH}$ begins to charge the load capacitor $C_{OUT}$, the output voltage $V_{OUT}$ begins to increase, as well.

The current $I_{CH}$ increases until it achieves a magnitude approximately equal to a predetermined current limit $I_{LIM}$, such as defined by the limit voltage $V_{LIM}$. Upon the current $I_{CH}$ being greater than the current limit $I_{LIM}$, the voltage control circuit 16 masks the clock signal CLK to the charge pump 12. As a result, the charge pump 12 halts the incremental increase of the gate voltage $V_{GATE}$, thus limiting the resistance of the pass-FET N1 and, consequently, the current $I_{CH}$ to the load capacitor $C_{OUT}$. However, because the current $I_{CH}$ is still provided to the load capacitor $C_{OUT}$, the output voltage $V_{OUT}$ continues to increase and the current $I_{CH}$ begins to decrease as the load capacitor $C_{OUT}$ is charged. Therefore, upon the current $I_{CH}$ decreasing below the predetermined current limit $I_{LIM}$, the voltage control circuit 16 unmasks the clock signal CLK. Accordingly, the charge pump 12 resumes the incremental increase of the gate voltage $V_{GATE}$.

As a result of the increase and decrease of the current $I_{CH}$, the masking and unmasking of the clock signal CLK is repeated until a time $T_1$, at which time the load capacitor $C_{OUT}$ is fully charged. As such, the output voltage $V_{OUT}$ becomes substantially equal to the positive supply voltage $V_{DD}$, and the current $I_{CH}$ is reduced substantially to zero, as demonstrated in the example of FIG. 2. The repeated masking and unmasking of the clock signal CLK is also demonstrated in the example of FIG. 2 by the step-increase of the gate voltage $V_{GATE}$, with level potentials corresponding to a masked clock signal CLK, and with the repeated increase and decrease of the current $I_{CH}$.

Figure 3:
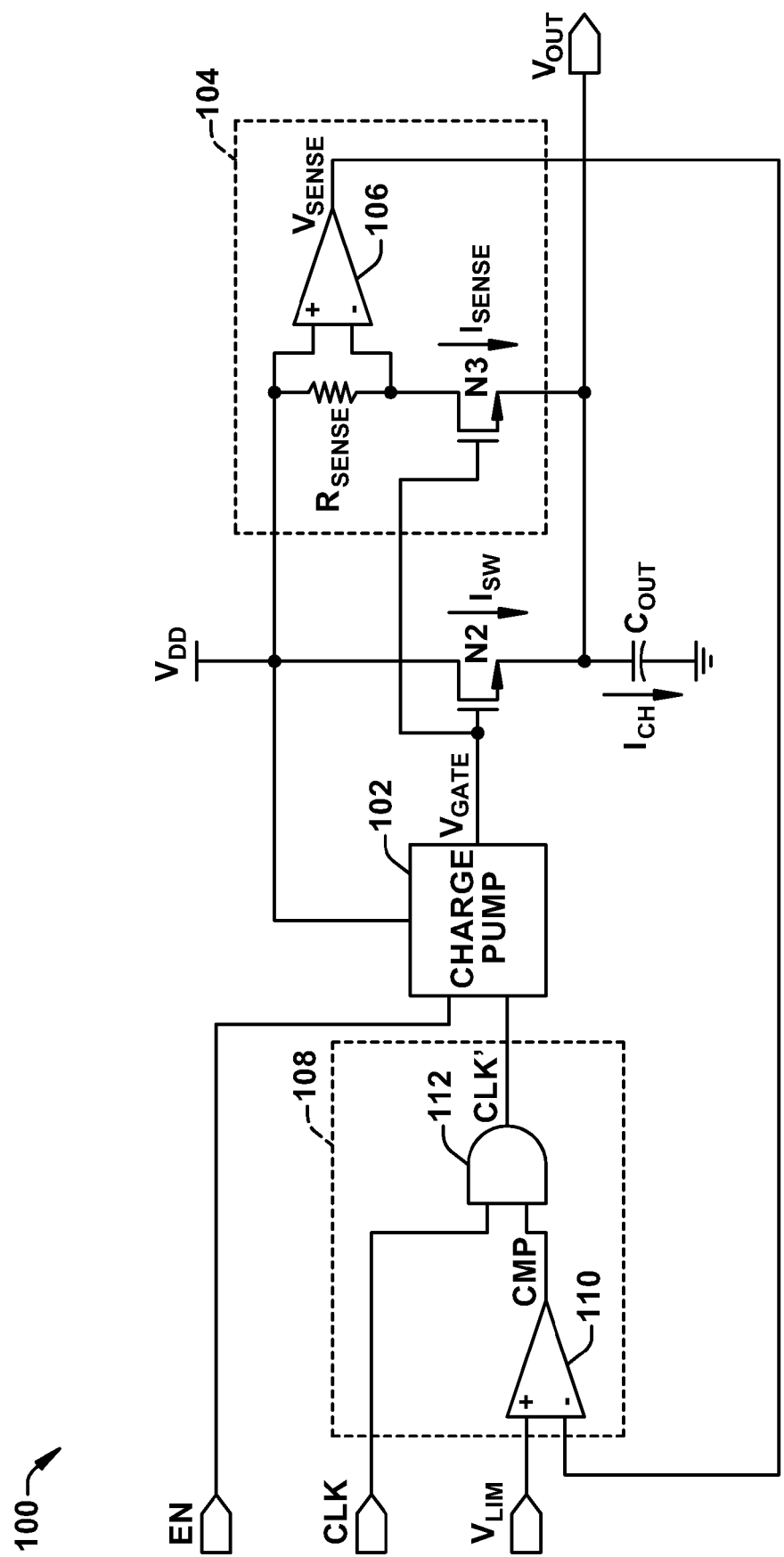
FIG. 3 illustrates another example of a power supply system in accordance with an aspect of the invention.

FIG. 3 illustrates another example of a power supply system 100 in accordance with an aspect of the invention. The power supply system 100 can be implemented as part of a switching power converter, buck and/or boost converter, linear power regulator, or any of a variety of other power providing applications. The power supply system 100 includes a charge pump 102 that is configured to activate a pass-FET N2, similar to as described above in the example of FIG. 1. Specifically, upon receiving an enable signal EN, the charge pump 102 begins to incrementally increase a gate voltage $V_{GATE}$ of the pass-FET N1 based on a clock signal CLK. As an example, the gate voltage $V_{GATE}$ can increase at a higher rate based on a relatively higher frequency of the clock signal CLK.

As the gate voltage $V_{GATE}$ incrementally increases, the pass-FET N2 switches from a cutoff region of operation and becomes activated in a linear (i.e., triode) region of operation. As a result, a resistance associated with the pass-FET N1 decreases at each increment that the gate voltage $V_{GATE}$ increases. Therefore, the current $I_{CH}$ that flows through the load capacitor $C_{OUT}$ increases at each increment that the gate voltage $V_{GATE}$ increases. Accordingly, the load capacitor $C_{OUT}$ begins to collect charge, which results in an increase of an output voltage $V_{OUT}$ between the source of the pass-FET N1 and the load capacitor $C_{OUT}$.

The power supply system 10 includes an inrush current monitor 104 that is configured to monitor a current-flow associated with the current $I_{CH}$. The inrush current monitor 104 includes an N-type FET N3 having a gate that is controlled by the gate voltage $V_{GATE}$ and a source that is coupled to the output voltage $V_{OUT}$. A resistor RSENSE is configured in series to interconnect the N-FET N3 and the positive supply voltage $V_{DD}$. Therefore, the resistor RSENSE and the N-FET N3 collectively form a current path that is in parallel with the pass-FET N2. In the example of FIG. 3, the current that flows through the resistor RSENSE and the N-FET N3 is demonstrated as a current $I_{SENSE}$, and the current that flows through the pass-FET N2 is demonstrated as a current $I_{SW}$. Therefore, the current $I_{CH}$ is equal to a sum of the current $I_{SW}$ and the current $I_{SENSE}$.

The pass-FET N2 and the N-FET N3 can be substantially fabricated together as matched transistors. In addition, because the N-FET N3 is likewise activated by the gate voltage $V_{GATE}$, the N-FET N3 can be activated substantially the same as the pass-FET N2. Specifically, the resistance of the N-FET N3 can be incrementally decreased substantially the same as the pass-FET N2. As a result of the pass-FET N2 and the N-FET N3 being matched transistors, the operation of the pass-FET N2 and the N-FET N3 can be independent of process and temperature variations relative to each other, such that the operation of the pass-FET N2 and the N-FET N3 can be substantially identical in response to the gate voltage $V_{GATE}$. Accordingly, the current $I_{SENSE}$ can be proportional to the current $I_{SW}$, such that the current $I_{SENSE}$ differs from the current $I_{SW}$ based solely on the resistance value of the resistor RSENSE.

The inrush current monitor 104 includes a differential amplifier 106 that is coupled to both sides of the resistor RSENSE. As a result, the differential amplifier 106 is configured to monitor a voltage across the resistor RSENSE that is associated with the current $I_{SENSE}$. The differential amplifier 106 thus generates a voltage $V_{SENSE}$ that is associated with the voltage across the resistor RSENSE, and thus associated with the current $I_{SENSE}$. As a result of the known relationship between the current $I_{SENSE}$ and the currents $I_{SW}$ and $I_{CH}$, the voltage $V_{SENSE}$ can therefore be correlated to the magnitudes of the currents $I_{SW}$ and $I_{CH}$.

The power supply system 100 includes a voltage control circuit 108. The voltage control circuit 108 includes a comparator 110 that is configured to compare the voltage $V_{SENSE}$, provided from the inrush current monitor 104, at an inverting input and a predetermined limit voltage $V_{LIM}$ at a non-inverting input. The voltage $V_{LIM}$ can be a voltage that is set to define a predetermined current limit for the current $I_{CH}$, or by extension, the currents $I_{SW}$ and/or the current $I_{SENSE}$. The limit voltage $V_{LIM}$ can be programmable, or can be set at a fixed potential. The comparator 110 provides a logic signal CMP to an AND-gate 112 within the voltage control circuit 108. Therefore, the signal CMP is logic-high when the limit voltage $V_{LIM}$ is greater than the voltage $V_{SENSE}$, and the signal CMP is logic-low when the voltage $V_{SENSE}$ is greater than the limit voltage $V_{LIM}$.

The AND-gate 112 also receives the clock signal CLK as an input, and thus provides a logical-AND operation of the clock signal CLK and the signal CMP to generate a modified clock signal CLK' that is provided to the charge pump 102. Therefore, upon the signal CMP being logic-high, such that the limit voltage $V_{LIM}$ is greater than the voltage $V_{SENSE}$, the modified clock signal CLK' is provided as a reproduction of the clock signal CLK to the charge pump 102. Therefore, the charge pump 102 continues to incrementally increase the gate voltage $V_{GATE}$. However, upon the voltage $V_{SENSE}$ being greater than the limit voltage $V_{LIM}$, the signal CMP is logic-low, resulting in the clock signal CLK being masked, such that the modified clock signal CLK' is set as a logic-low DC signal. As a result, the charge pump 102 halts the incremental increase of the gate voltage $V_{GATE}$, thus freezing the gate voltage $V_{GATE}$ to a substantially constant magnitude. Accordingly, the resistance of the pass-FET N2 also remains constant. In response, the current $I_{CH}$ does not increase in magnitude, and thus temporarily remains substantially equal to the predetermined current limit defined by the limit voltage $V_{LIM}$.

Because the gate voltage $V_{GATE}$ remains constant, the current $I_{CH}$ continues to flow to the load capacitor $C_{OUT}$ upon the current $I_{CH}$ achieving the predetermined current limit. Therefore, the output voltage $V_{OUT}$ continues to increase, causing the current $I_{CH}$ to be reduced in magnitude as the load capacitor $C_{OUT}$ continues to charge. Therefore, the voltage $V_{SENSE}$ likewise begins to decrease. Upon the voltage $V_{SENSE}$ becoming less than the limit voltage $V_{LIM}$, the signal CMP becomes logic-high, thus unmasking the clock signal CLK. Accordingly, the charge pump 102 is once again provided with the clock signal CLK, such that the gate voltage $V_{GATE}$ can continue to incrementally increase, resulting in more of the current $I_{CH}$ being provided to the load capacitor $C_{OUT}$. The current $I_{CH}$ can thus substantially waver above and below the predetermined current limit as the cycle of masking and unmasking of the clock signal CLK is repeated based on the monitoring of the voltage across the resistor RSENSE and the comparison of the voltage $V_{SENSE}$ with the limit voltage $V_{LIM}$ by the comparator 110.

As a result of the continued masking and unmasking of the clock signal CLK, the gate voltage $V_{GATE}$ can be controlled to provide a substantially steady amount of the current $I_{CH}$, such as defined by the predetermined current limit. Therefore, the load capacitor $C_{OUT}$ can be rapidly charged despite limiting the magnitude of the current $I_{CH}$. Accordingly, the inrush current through the pass-FET N2 can be limited while maintaining a rapid charging time of the load capacitor $C_{OUT}$.

It is to be understood that the power supply system 100 is not intended to be limited to the example of FIG. 3. As an example, the power supply system 100 is not limited to the use of N-type FETs for the pass-FET N2 and the N-FET N3, but could implement any of a variety of different types of transistors, such as BJTs or P-type FETs. As another example, the load is not limited to the use of the load capacitor $C_{OUT}$, but could be any of a variety of capacitive, inductive, and/or resistive loads. Therefore, the power supply system 100 can be configured in any of a variety of ways.

Figure 4:
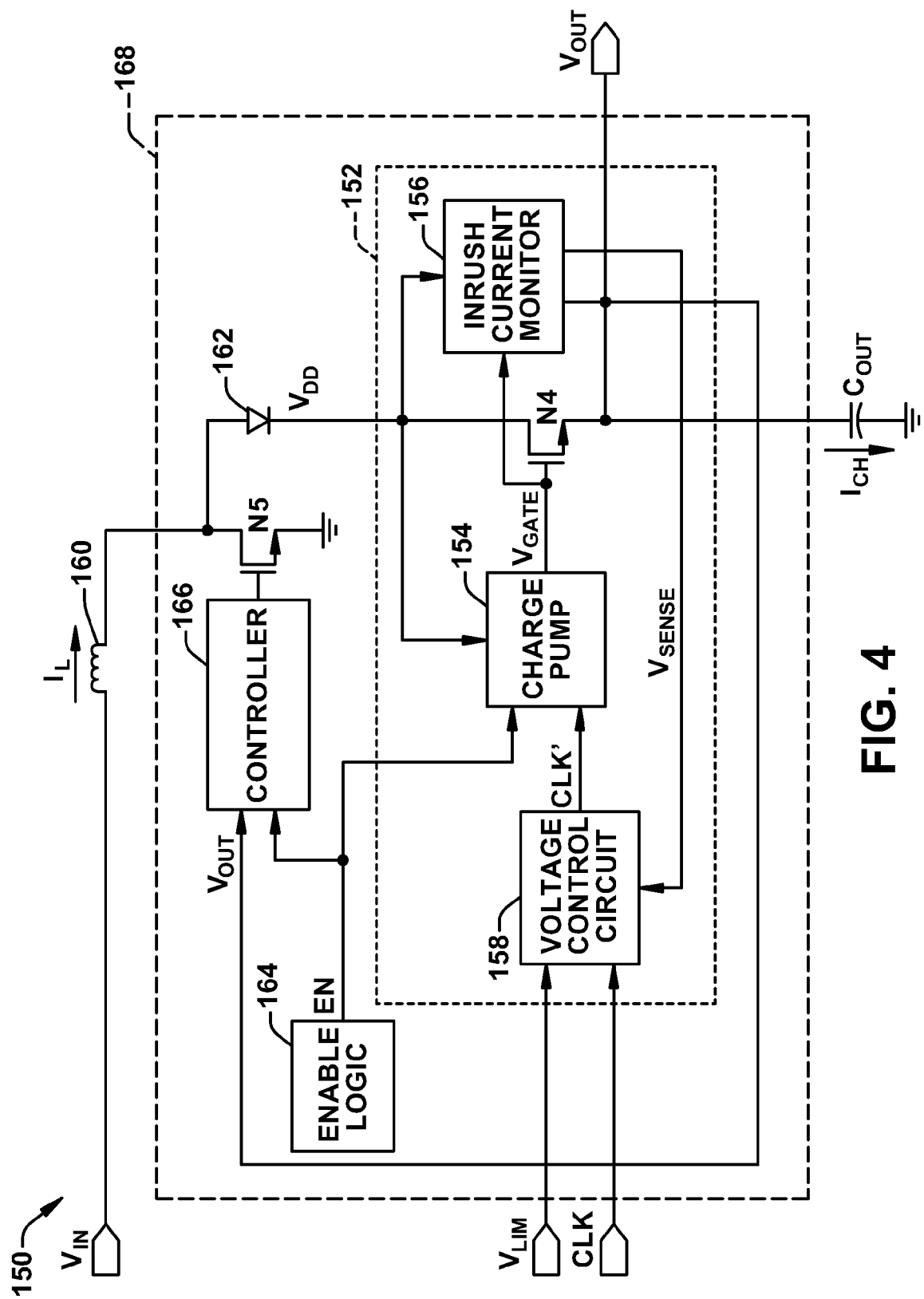
FIG. 4 illustrates an example of a power converter system in accordance with an aspect of the invention.

FIG. 4 illustrates an example of a power converter system 150 in accordance with an aspect of the invention. The power converter system 150 is demonstrated in the example of FIG. 4 as a boost converter. The power converter system 150 includes a power supply system 152, which is demonstrated in the example of FIG. 4 as being substantially similar to the power supply system 10 in the example of FIG. 1. Specifically, the power supply system 152 includes a charge pump 154 configured to activate a pass-FET N4 to charge a load capacitor $C_{OUT}$, an inrush current monitor 156, and a voltage control circuit 158 that are each configured to operate in substantially the same manner as described above in the example of FIG. 1. Therefore, the operation of the power supply system 152 will not be further explained for the sake of brevity.

In the example of FIG. 4, an input voltage $V_{IN}$ is provided to an inductor 160. The input voltage $V_{IN}$ can be provided from a voltage source, such as a battery. The inductor 160 provides a current $I_L$ to a diode 162 and an N-type FET N5. At the output of the diode 162 is the positive supply voltage $V_{DD}$ from which the load capacitor $C_{OUT}$ is charged upon activation of the pass-FET N4. In addition, the power converter system 150 includes enable logic 164 configured to provide the enable signal EN, and a controller 166 that is configured to control activation of the N-FET N5, such as in response to the enable signal EN and the output voltage $V_{OUT}$. The power supply system 152, the N-FET N5, the diode 162, the enable logic 164, and the controller 166 can all be configured together as a power regulator 168, such that the power regulator 168 can be configured as an integrated circuit (IC).

In the example of FIG. 4, the N-FET N5 can be implemented as an isolation switch. As an example, the N-FET N5 can be activated at a time that the enable signal EN is logic-low. Therefore, the current $I_L$ through the inductor 160 can be sunk to ground, such that it is not provided through the diode 162, thus isolating the power supply system 152 from the input voltage $V_{IN}$. Upon the enable signal EN being asserted, the controller 166 can deactivate the N-FET N5, thus steering the current $I_L$ through the diode 162. As a result, the positive supply voltage $V_{DD}$ can be substantially equal to the input voltage $V_{IN}$ (e.g., less the potential across the diode 162). Thus, the charge pump 154 can begin activating the pass-FET N4 to charge the load capacitor $C_{OUT}$. Upon the output voltage $V_{OUT}$ achieving a voltage substantially equal to the positive supply voltage $V_{DD}$, such that the load capacitor $C_{OUT}$ is substantially fully charged, the controller 166 can again activate the N-FET N5, thus isolating the power supply system 152 from the input voltage $V_{IN}$ once again. The controller 166 can also be configured to activate/deactivate the N-FET N5 in response to a number of other conditions, such as including different input signals and/or varying magnitudes of the output voltage $V_{OUT}$.

It is to be understood that the power converter system 150 is not intended to be limited to the example of FIG. 4. As an example, the power converter system 150 is not limited to a boost converter, but can be implemented as any of a variety of power providing systems that includes the power supply system 152. For example, the power supply system 152 can be implemented in a DC-DC switching power converter, buck or buck/boost converter, linear power regulator, or any of a variety of other power providing applications. Therefore, the power converter system 150 can be configured in any of a variety of ways.

Figure 5:
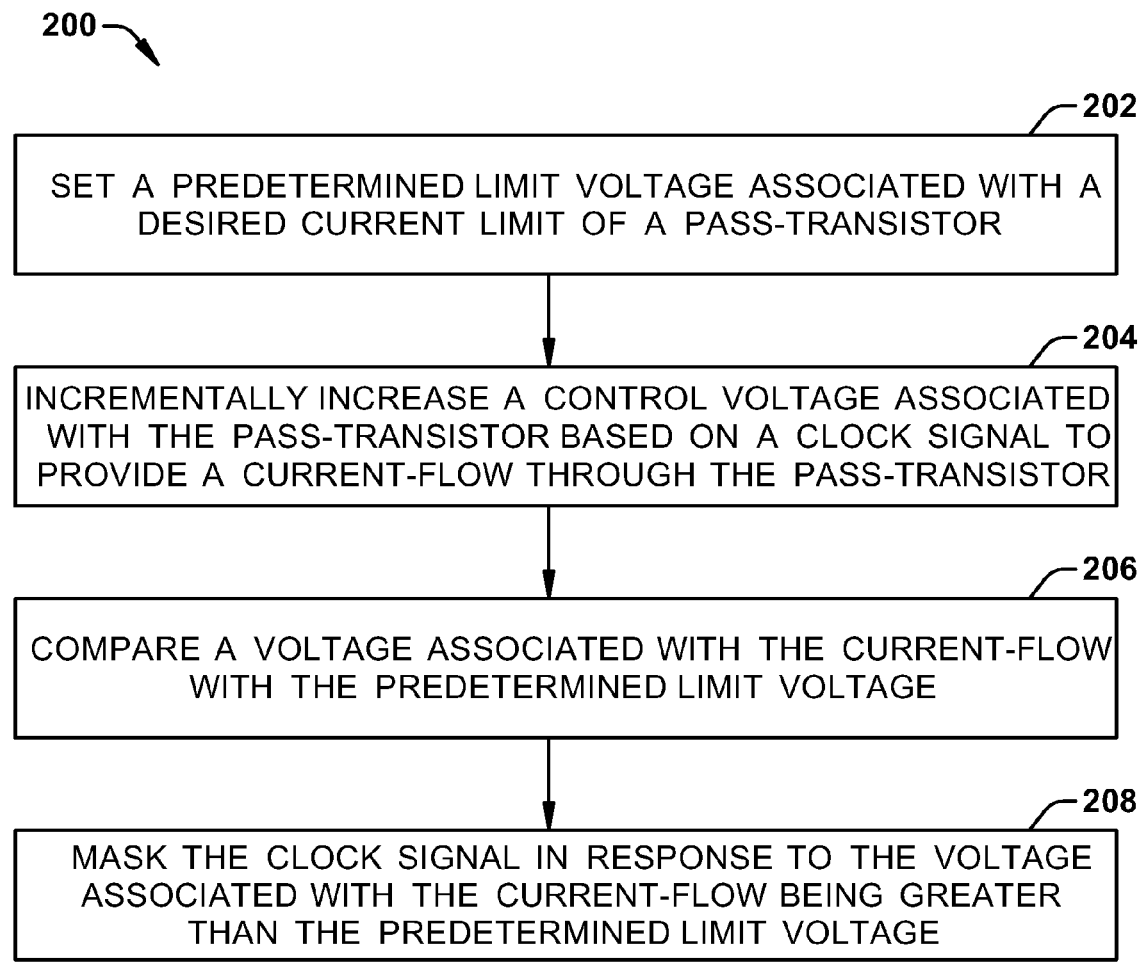
FIG. 5 illustrates a method for limiting inrush current in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates a method 200 for limiting inrush current in accordance with an aspect of the invention. At 202, a predetermined limit voltage associated with a desired current limit of a pass-transistor is set. The pass-transistor can be a FET. The desired limit of the current-flow can be set at a magnitude at which inrush current is to be limited. At 204, a control voltage associated with the pass-transistor is incrementally increased based on a clock signal to provide a current-flow through the pass-transistor. The control voltage can be a gate voltage of the FET. The incremental increase of the control voltage can be in response to a charge-pump that is controlled by the clock signal.

At 206, a voltage associated with the current-flow through the pass-transistor is compared with the predetermined limit voltage. The voltage associated with the current-flow can be a voltage across a sense-resistor in a parallel current path with the pass-transistor. The predetermined limit voltage can be a voltage associated with a predetermined current limit of the current-flow through the pass-transistor. At 208, the clock signal can be masked in response to the voltage associated with the current-flow through the pass-transistor being greater than the predetermined limit voltage. The masking of the clock signal can set the frequency of the clock signal substantially to zero, and can be based on a logic operation.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising:
    a variable voltage source configured to provide and incrementally increase a control voltage associated with a pass-transistor;
    an inrush current monitor configured to monitor a current-flow associated with the pass-transistor; and
    a voltage control circuit configured to temporarily halt the incremental increase of the control voltage in response to the current-flow exceeding a predetermined current limit, wherein the current-flow associated with the pass-transistor is maintained at the predetermined current limit by the control voltage on a gate capacitance of the pass-transistor until the current-flow drops below the predetermined current limit, then allowing the control voltage to again increase incrementally from a point at which its incremental increase was halted.

2. The power supply system of claim 1, wherein the pass-transistor is configured to couple a capacitive load to a positive supply voltage to charge the capacitive load.

3. The power supply system of claim 1, wherein the inrush current monitor comprises a second transistor coupled in series with a sense-resistor, the second transistor being matched with the pass-transistor and activated by the control voltage.

4. The power supply system of claim 3, wherein the inrush current monitor further comprises a differential amplifier configured to monitor a first voltage associated with the sense-resistor to generate a second voltage that is associated with the current-flow associated with the pass-transistor.

5. The power supply system of claim 4, wherein voltage control circuit comprises a comparator configured to compare the second voltage with a predetermined limit voltage that is associated with the predetermined current limit.

6. The power supply system of claim 5, wherein the voltage control circuit further comprises an AND-gate configured to receive a clock signal and an output of the comparator and to provide a modified clock signal that is configured to control a rate of incremental increase of the control voltage provided by the variable voltage source, the AND-gate being configured to mask the clock signal in response to the second voltage being greater than the predetermined limit voltage.

7. The power supply system of claim 1, wherein the variable voltage source is configured as a charge-pump operative to incrementally increase the control voltage based on a clock signal.

8. The power supply system of claim 1, wherein the voltage control circuit comprises an AND-gate configured to mask a clock signal to the variable voltage source in response to a voltage associated with the current-flow being greater than a predetermined limit voltage that is associated with the predetermined current limit.

9. The power supply system of claim 8, wherein the inrush current monitor comprises a differential amplifier configured to generate the voltage associated with current-flow based on a current-flow through a sense-resistor and second transistor configured in parallel with the pass-transistor.

10. A power converter system comprising the power supply system of claim 1.

11. An integrated circuit comprising the power supply system of claim 1.

12. A method for limiting inrush current associated with a pass-transistor, the method comprising:
    setting a predetermined limit voltage that is associated with a desired current limit of the pass-transistor;
    incrementally increasing a control voltage that is associated with the pass-transistor based on a clock signal to provide a current-flow associated with the pass-transistor; and
    temporarily masking the clock signal in response to a sense-voltage that is associated with the current-flow being greater than the predetermined limit voltage, wherein the current-flow associated with the pass-transistor is maintained at the predetermined current limit by the control voltage on a gate capacitance of the pass-transistor until the current-flow drops below the predetermined current limit, then unmasking the clock signal to allow the control voltage to again increase incrementally from a point at which the clock signal was masked.

13. The method of claim 12, further comprising charging a capacitive load with the current-flow associated with the pass-transistor.

14. The method of claim 12, further comprising monitoring a second current-flow through a sense-resistor that is configured in a parallel current path with the pass-transistor to generate the sense-voltage.

15. The method of claim 14, further comprising controlling a second transistor that is configured in series with the sense-resistor via the control voltage.

16. The method of claim 12, wherein masking the clock signal comprises:
    comparing the sense-voltage with the predetermined limit voltage; and
    setting the clock signal to substantially zero frequency via an AND-gate upon the sense-voltage being greater than the predetermined limit voltage.

17. A power supply system comprising:
    means for charging a capacitive load upon incrementing an enable signal;
    means for incrementally increasing a control voltage associated with the means for charging to provide a current-flow through the capacitive load based on a clock signal;
    means for monitoring a magnitude of the current-flow through the capacitive load; and
    means for temporarily masking the clock signal in response to the magnitude of the current-flow being greater than a predetermined current limit, wherein the current-flow associated with the pass-transistor is maintained at the predetermined current limit by the control voltage on a gate capacitance of the pass-transistor until the current-flow drops below the predetermined current limit, then unmasking the clock signal to allow the control voltage to again increase incrementally from a point at which the clock signal was masked.

18. The power supply system of claim 17, wherein the means for monitoring comprises:
- means for measuring a current-flow through a sense-resistor that is configured in a current path in series with the capacitive load and for generating a sense-voltage that is associated with the current-flow through the capacitive load.

19. The power supply system of claim 18, wherein the means for masking comprises means for comparing the sense-voltage with a predetermined limit voltage that is associated with the predetermined current limit.

20. The power supply system of claim 17, wherein the means for masking comprises a logical operator configured to set the clock signal to substantially zero frequency in response to the magnitude of the current-flow being greater than a predetermined current limit.

* * * * *